United States Patent [19]

Onufer

[11] Patent Number: 4,829,968
[45] Date of Patent: May 16, 1989

[54] MOBILE FUEL TANK VAPOR EMISSION CONTROL SYSTEM AND METHOD

[76] Inventor: George R. Onufer, 836 Cliffs Dr., Ypsilanti, Mich. 48197

[21] Appl. No.: 6,928

[22] Filed: Jan. 27, 1987

[51] Int. Cl.$^4$ ............................................. F02M 39/00
[52] U.S. Cl. .................................. 123/518; 123/520; 55/88; 137/844
[58] Field of Search ............... 123/518, 519, 520, 521, 123/514, 516; 55/88, 387; 137/844

[56] References Cited

U.S. PATENT DOCUMENTS

| | | | |
|---|---|---|---|
| 2,560,152 | 7/1951 | Berl | 123/518 |
| 3,757,753 | 9/1978 | Hunt | 123/519 |
| 3,881,894 | 5/1975 | Onufer | 55/88 |
| 3,884,204 | 5/1975 | Krautwurst | 123/519 |
| 3,903,942 | 9/1975 | Vest | 137/844 |

FOREIGN PATENT DOCUMENTS

| | | | |
|---|---|---|---|
| 0021524 | 2/1977 | Japan | 123/519 |
| 0164763 | 12/1980 | Japan | 123/518 |
| 0000544 | 1/1981 | Japan | 123/519 |
| 0185966 | 10/1983 | Japan | 123/520 |

Primary Examiner—Carl Stuart Miller
Attorney, Agent, or Firm—James M. Deimen

[57] ABSTRACT

A method and on board apparatus to recycle gasoline vapor emissions from the head space of a motor vehicle gasoline tank during refueling and operation of the vehicle. The apparatus comprises a canister to collect and store gasoline vapor from the head space and a vapor fan and sparger combination to retrieve vapor driven from the canister during a heating cycle and to dissolve the vapor in the liquid gasoline in the tank. The canister includes an adsorbent to separate the vapor from air and a vent valve to release air from the canister. Inside the canister is a ceramic heater, a temperature sensor and an adsorbed vapor sensor. A water drain permits condensed moisture to be released from the canister. The sparger comprises a microscopically porous body having a plurality of relatively large blind passages therein, the sparger body being entirely immersed in the liquid gasoline. The method comprises collecting the head space vapor in the canister with an effective adsorber during refueling of the vehicle and subsequently, during operation of the vehicle, driving the adsorbed vapor from the canister with a source of heat and blowing the vapor under sufficient pressure to force the vapor into intimate contact with liquid gasoline inside and on the surface of the sparger. A splash back valve prevents head space vapor and liquid gasoline from traveling back up the fill pipe of the gasoline tank while maintaining hydrostatic communication between the bottom of the tank and the fill pipe.

25 Claims, 4 Drawing Sheets

MOBILE FUEL TANK VAPOR EMISSION CONTROL SYSTEM AND METHOD

BACKGROUND OF THE INVENTION

The field of the invention pertains to automotive gasoline fuel tanks and the prevention of gasoline vapor release from such tanks to the environment. In particular, the invention is directed to recycling back into the liquid gasoline, the lighter fractions of gasoline such as butane which have vaporized into the head space of a gasoline tank.

In recent years the Reed Vapor Pressure of gasoline, which is a measure of gasoline volatility, has generally increased indicating that most gasoline refiners are producing gasoline with a higher percentage of the lighter more volatile fractions. The loss of gasoline vapors to the environment per gallon produced and sold is therefore increasingly important.

The United States Environmental Protection Agency is currently developing additional Federal test producers to establish allowable vapor emission standards during refueling of motor vehicles. Tighter standards may also be applied to vapor emissions during vehicle operation and as a result of ambient temperature changes.

In addition to adding to the photochemical smog loading of the environment, the refueling vapor emissions are of direct concern due to the benzene content, benzene being a known carcinogen. The potential health effect of exposure to gasoline vapors is taking on increased importance as a general health concern.

A number of systems have been proposed to collect the gasoline vapors at the refueling or service station. Some systems suggest vacuuming up the vapors released at the pump, in particular from the area adjacent the nozzle and fill pipe. Other systems attempt to return vapor from the vehicle tank head space to the storage or supply tank at the service station during the refueling. These systems, however, grow less effective as the Reed Vapor Pressure of the gasoline increases. With the increased Reed Vapor Pressure these systems become more costly to install and maintain and are cumbersome. They are not easily adaptable to all vehicle gasoline tanks for adequate effectiveness.

Many service stations cannot economically support the installation of elaborate systems to control vapor emissions. Two pump and store front stations, in particular, would have great difficulty supporting elaborate systems. Since the gasoline vapors have been originally dispensed as liquid from the gasoline pump, return of the vapors to the service station presents a question of ownership and reimbursement for the vapors returned. Gasoline is a valuable commodity and the vapors lost or returned at a busy service station can total several liquid gallons per day and therefore represent substantial economic value during the course of a year.

Applicant's U.S. Pat. Nos. 3,881,894 and 3,581,782 disclose means and methods for recycling gasoline vapors driven from the head space of an automotive fuel tank back into the underground storage tank of a gasoline station. In the earlier patent applicant also disclosed a means to recycle such gasoline vapors back to the delivery tank or carburetor of a truck used for direct supply of gasoline to automobiles. In both of these disclosures the apparatus for recycling the gasoline vapors is sizable and heavy, being directed to fixed installation at a gasoline station or mounted on a heavy truck.

The later issued above patent discloses a device named a sparger and comprising a labyrinth of microscopic passageways immersed in liquid gasoline. The sparger has been found particularly effective in causing gasoline vapors to be reabsorbed by the liquid gasoline. In a manner not completely understood, the microscopic passageways greatly encourage the dissolution of the vapors into the liquid gasoline.

Because of the wide variety of automobile and truck gasoline tank sizes, the variability and lack of control over the manual refilling of gasoline tanks and maintenance problems with devices attached to the filler nozzle of a gasoline pump, a need exists for an on board completely automatic means to collect and recycle the gasoline vapors in the head space of an automobile gasoline tank. Means are also needed to prevent liquid gasoline splash back and vapor from travelling back up the fill pipe of the tank during refueling.

SUMMARY OF THE INVENTION

The invention comprises method and on board apparatus to recycle the gasoline vapors collected in the head space of an automobile or truck gasoline tank back into the liquid gasoline in the tank. The invention is also applicable to marine and aircraft gasoline tanks. The new apparatus includes an improved sparger submerged in the liquid gasoline and means to collect and store the gasoline vapors driven from the head space of the tank as the tank is refilled with gasoline or as a result of ambient temperature changes. The invention includes a method for controlling recycling of the vapors automatically in programmed response to a signal such as engine start-up or sufficient vapor collection in the vapor storage means. Preferably the method includes a scheduled delay until the vehicle electrical charging circuit is regenerated and operating properly.

In one embodiment, the apparatus comprises a first fluid conduit extending from the head space of the gasoline tank to a collection canister filled with an adsorber of gasoline vapors such as activated charcoal or the like. A second fluid conduit extends from the canister to a sparger immersed in the liquid gasoline adjacent the bottom of the tank. The first fluid conduit includes a check valve to prevent back flow of vapors to the head space. The canister includes a downstream relief valve or vent to the atmosphere and a moisture drain. The second fluid conduit includes a small vapor fan to force vapors from the canister into and through the microscopic pores of the sparger.

In a second embodiment the first fluid conduit and check valve connect the head space to the canister, however, the second fluid conduit extends from the canister back to the head space. A separate third fluid conduit extends from the head space through a small vapor fan to the sparger.

Both embodiments of the fluid circuitry above include certain other features. Firstly, a weighted splashback flap or spring loaded lip located at the entrance of the filler pipe to the tank can be included to prevent surges of liquid gasoline from rising up the filler pipe and splashing out the top. An alternate splashback valve is disclosed which prevents back-up of liquid or vapor into the fill pipe but provides communicatin of hydrostatic pressure from the bottom of the tank to the fill pipe. Secondly, means are required to cause the gasoline vapor collected in the canister to be released efficiently for recycling. The canister may be heated electrically or with heat generated by the engine to release the vapor for recycling through the sparger. In the preferred embodiments a programmed electric ceramic heater is incorporated in the canister. Thirdly, a control system to sense build-up of vapor in the canister, to apply heat to the canister, and to turn on the vapor fan is provided to most effectively recycle the vapor.

The canister collects vapor as the air and vapor in the head space is driven through the canister during filling of the tank. Subsequently, shortly after the ignition or electrical system of the vehicle is energized, the control system senses the build-up of vapor in the canister, and if sufficient, the source of heat is applied to the canister and the vapor fan operated to remove the vapor from the canister and pass the vapor through the sparger for dissolution back into the liquid gasoline. Water vapor condensation in the canister during cool periods passes through a drain valve in the bottom of the canister.

Although the splash back flap is a desirable but optional attachment, the canister heater and control system are necessary for efficacious operation of the vapor emission recycling method and apparatus. The use of the splash back flap or alternative valve, however, eliminates the need for boots or sealing devices on the gas pump nozzle or fill pipe entrance. The expensive gasoline station installation is also thereby eliminated in favor of a very inexpensive attachment within the vehicle tank.

The sparger comprises a porous metal or ceramic body having an inlet chamber fed by the conduit from the vapor fan. A plurality of relatively large blind passages are formed in the sparger body. The blind passages have no direct connection to the exterior of the body or the inlet chamber. Rather, all fluid communication with the sparger body is through the microscopic pores. For reasons not fully understood, the blind passages further assist in the dissolution of the gasoline vapor into the liquid gasoline within which the sparger is fully immersed. With dissolution the heat of vaporization is released to the liquid gasoline causing heating of the sparger and liquid gasoline thereadjacent. Fresh liquid gasoline tends to be drawn upwardly into and about the sparger as a result.

DESCRIPTION OF THE PREFERRED EMBODIMENTS

Figure 1:
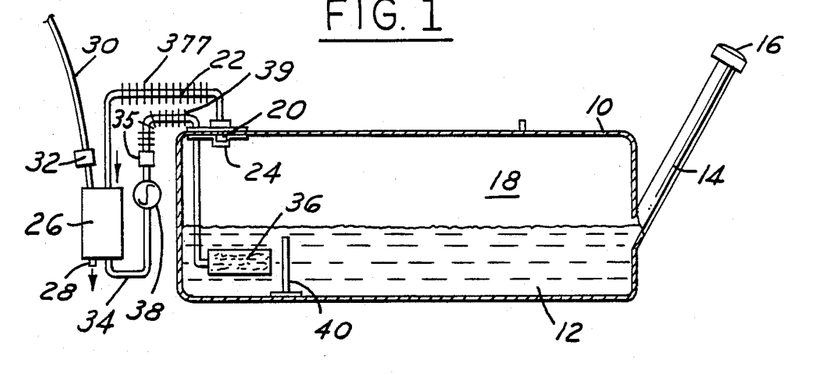
FIG. 1 is a schematic view of a gasoline fuel tank and vapor emission control system.

FIG. 1 illustrates a gasoline fuel tank 10 partially filled with liquid gasoline 12. A filler pipe 14 extends upwardly from the tank 10 to a fill pipe cap 16 which effectively seals the fill pipe opening under the cap. Above the gasoline 12 is the head space 18 in the tank 10 which decreases as the tank is refilled. Conventionally, as the tank 10 is refilled, the air and gasoline vapor mixture in the head space is driven from the tank either through the fill pipe opening about the gasoline pump nozzle (not shown) or through a small diameter vent pipe (not shown) that communicates from the head space 18 to the environment.

In FIG. 1, however, a vent directly to the environment is not provided. Rather, the head space air and vapor is driven during refilling through a one-way or check valve 20 and conduit 22 that communicate with the head space. The entrance to the valve 20 and conduit 22 is equipped with a filter 24 having a mesh size sufficient to easily permit passage of air and vapor but to substantially prevent the entrance of liquid gasoline and foreign debris.

The conduit 22 leads to a canister 26 filled with an effective adsorber of gasoline vapors such as activated charcoal. The canister 26 includes a check-valve air vent 28 that permits the release of air from the head space, the air having been stripped of the vapor by the adsorber in the canister. Optionally, a conduit 30 leads to the canister 26 from the engie compartment and carburetor of the vehicle, thus permitting the same canister to also serve as the vapor boil off collector from the engine. The vapor boil off conduit also includes a one way valve 32 to assure that air and vapor mixture from the head space 18 or canister 26 cannot be driven inadvertently back toward the engine of the vehicle.

An outlet conduit 34 communicates between the canister 26 and a sparger 36 located within the lower portion of the tank 10. A vapor fan or vacuum pump 38 is connected in the conduit 34 to drawn vapor from the canister 26 and pump the vapor through a check valve 35 and the pores of the sparger 36 as further described below. Cooling fins 37 may be added to conduit 22 to increase the adsorber effectiveness in the canister.

The sparger 36 is submerged in the liquid gasoline 12 and ideally is located adjacent the bottom of the tank 10 so as to remain submerged when the tank is almost empty. To minimize contamination of the sparger 36 with dirt and water and to maximize the natural flow of liquid gasoline through the pores of the sparger, the sparger is preferably spaced from the tank bottom. As shown, a baffle 40 in the tank 10 may be provided to retain liquid gasoline about the sparger or, alternatively, a well may be provided in the tank bottom. Cooling fins 39 may be added to conduit 34 to increase the sparger effectiveness by cooling the entering vapor.

Figure 2:
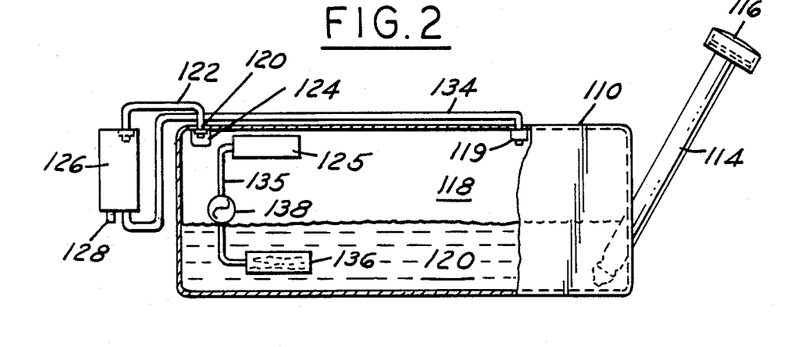
FIG. 2 is a schematic view of a gasoline fuel tank and alternate form of vapor emission control system.

FIG. 2 illustrates an alternate embodiment of the fluid circuitry for the vapor emission control system. The tank 110 includes a filler pipe 114 and cap 116 as above. The tank 110 is shown partially filled with liquid gasoline 112 and head space 118 thereabove. A conduit 122 leads from a one-way valve 120 and filter 124 to a canister 126 filled with a suitable adsorber. The canister includes a one-way air vent 128 for the release of air to the environment downstream from the stripping of gasoline vapor by the adsorber in the canister 126.

Leading from the canister 126 is a conduit 134 that communicates directly with the head space 118 through a check valve 119 at the top of the tank 110. Within the tank 110 a separate conduit 135 connects the head space 118 with a sparger 136 submerged in the liquid gasoline 12. The conduit 135 is equipped with a sparger filter 125 in the head space of a mesh size sufficient to easily permit the entrance of air and vapor but to substantially prevent the entrance of liquid gasoline and debris. A vapor fan or vacuum pump 138 is located in the conduit 135 to draw vapor from the head space 118 and pump the vapor through pores of the sparger 136.

Figure 3:
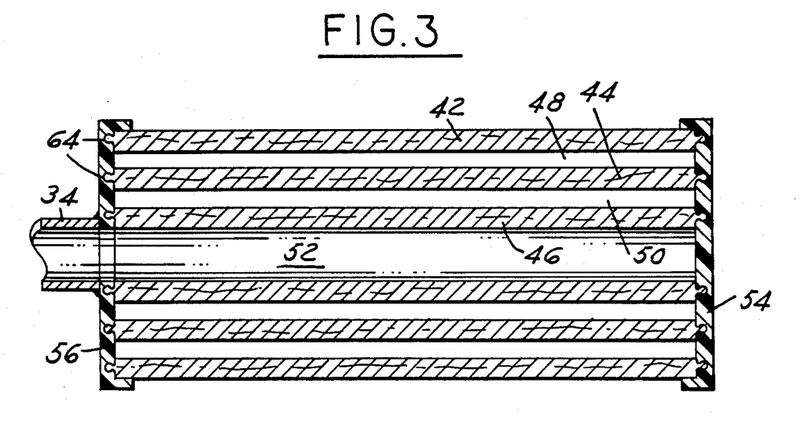
FIG. 3 is a cross sectional view of a cylindrical sparger taken along a diametral plane.
Figures 4, 5:
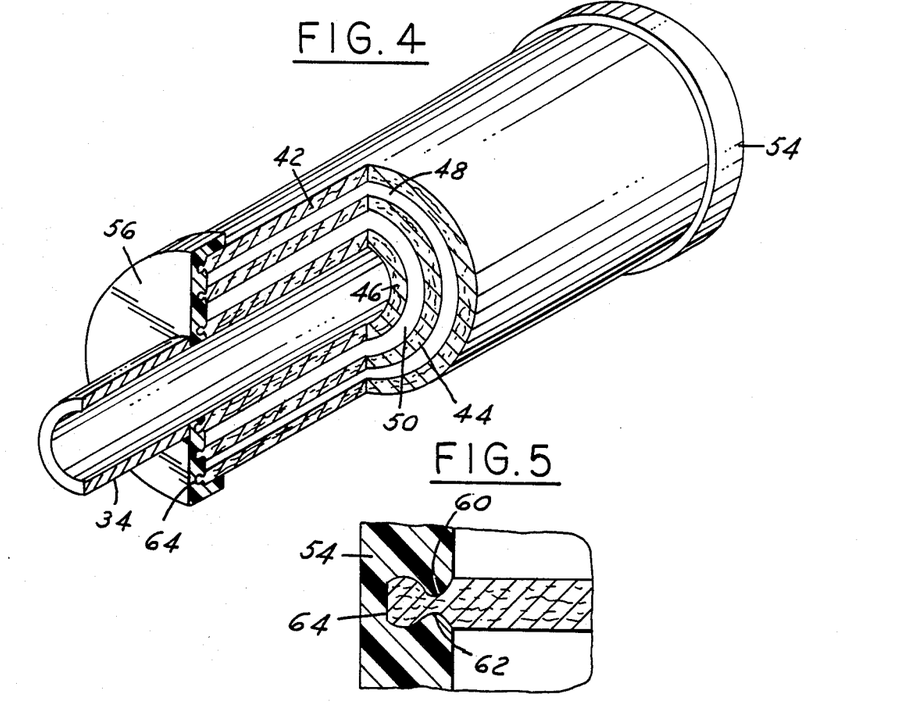
FIG. 4 is a cut-away perspective view of the sparger.
FIG. 5 is a detail of the sparger end cap assembly.

FIGS. 3, 4 and 5 illustrate either sparger 36 or 136 in detail. The sparger comprises a plurality of concentric sleeves or cylinders 42, 44 and 46 spaced apart radially by concentric passageways 48 and 50. Conduit 34 (or 135) communicates with a central chamber 52 within the innermost sleeve 46. Plastic end caps 54 and 56 retain the sleeves 42, 44 and 46 together with an opening 58 in cap 56 for the insertion and attachment of the conduit 34. The attachment of the sleeves 42, 44 and 46 is detailed in FIG. 5 wherein a snap fit is provided by slight circumferential grooves 60 in the sleeves and corresponding circumferential bands 62 formed in the ring grooves 64 of the cap. Alternatively, the caps may be attached to the sleeves 42, 44 and 46 with a press fit or by taking advantage of the rough sleeve surfaces created by the pores in the sleeves, the caps may be molded directly to the sleeves.

The sleeves 42, 44 and 46 are preferably formed of a ceramic or metal powder or combination of both that is sintered to bond the powder into a rigid form. The sleeves are of outwardly decreasing average pore size with innermost sleeve 46 of 40 micron porosity, middle sleeve 44 of 30 micron porosity and sleeve 42 of 20 micron porosity.

Figures 6, 7:
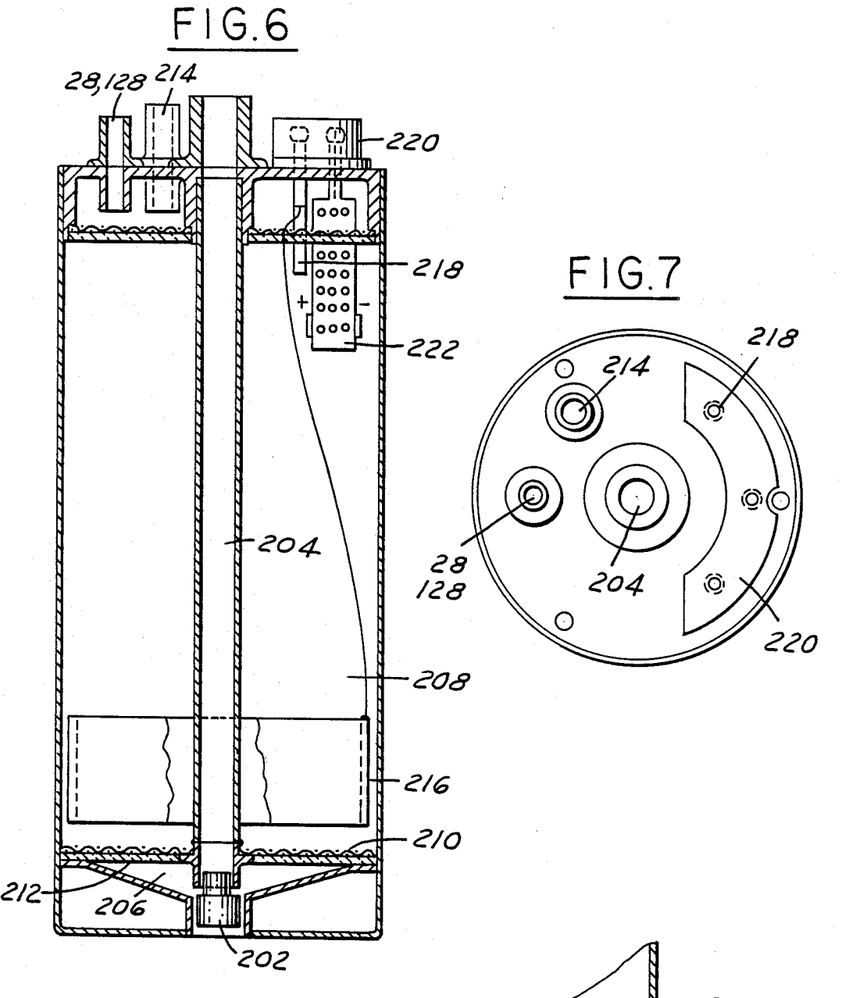
FIG. 6 is a cross sectional side view of the canister.
FIG. 7 is a top view of the canister.

FIG. 6 illustrates either canister 26 or 126 with either air valve or vent 28 or 128 in the top of the canister. At the bottom of the canister is a water drain valve 202 (schematically shown) to permit any water condensation in the canister to drain therefrom. The drain valve 202 may be operated by a bimetallic actuator to open and close as the canister is heated through a selected temperature range or the drain valve may be electrically actuated by a solenoid upon a signal from the vapor emission system controller detailed below. As examples, as the canister warms from 60° F. to 80° F. the valve opens and then closes to release water or the valve is signalled to open for 30 seconds when the canister warms to 80° F.

Within the canister is a central vapor intake tube 204 that is connected to the conduit 22 or 122 from the gasoline tank head space. The intake tube 204 may also include an auxiliary intake for the optional conduit 30 from the engine. The intake tube 204 opens into a chamber 206 from which the air and vapor circulate upwardly through the adsorber 208 loosely packed in the canister. The adsorber 208, such as activated charcoal, is supported on a wire grid or stamped screen 210 above the chamber 206. A porous plastic mat 212 may be included to prevent the adsorber from leaking into the chamber 206. The air from the tank head space, having had the vapor adsorbed, is released through the check valve air vent 28 or 128. An outlet connection 214 from the canister provides connection to conduits 34 or 134.

Also within the canister is a cylindrical ceeramic heater 216 located concentric with the vapor and air intake tube 204. The ceramic heater 216 is pierced by a plurality of holes to permit air and vapor to freely circulate therethrough. Printed or plated on the inner and outer surfaces of the ceramic heater 216 is an aluminum electrode pattern to supply power to the ceramic for heating the canister. Attached to the canister is a temperature sensor 218 and controller module 220 to monitor and control the heating cycle of the canister, operation of the vapor fan 38 or 138 and optional electric water drain valve 202.

In addition to the canister temperature sensor, the canister incorporates a gasoline vapor adsorption sensor 222. The vapor adsorption sensor 222 comprises a pair of electrodes separated by a quantity of the adsorbent 208 in the canister through which the air and vapor mixture passes during filling of the tank. The vapor adsorption sensor 222 operates as a capacitance variable as a function of the quantity of vapor adsorbed on the adsorbent between the electrodes. With the passage of the air and vapor mixture therethrough the quantity of vapor adsorbed between the electrodes increases.

In the preferred method of operation, the vapor is adsorbed on the activated charcoal as the air and vapor mixture is driven from the head space of the tank through the canister during refilling of the tank. The stripped air exhausts through the air vent 28 or 128.

Upon completion of the refilling and restarting of the vehicle engine, the control module 220, which comprises a small central processor (CPU) and a read only memory (ROM) is energized. The module is programmed to hesitate until the engine is running smoothly and the electric circuit stabilized. If the module senses adsorbed vapor above a preset amount by the change in capacitance of sensor 222, the module actuates the heater 216 to warm the canister and, if so equipped, the electric water drain valve 202 is opened at 80° F. for 30 seconds.

With heating of the canister by the heater 216 the temperature is raised to a preset level such as 250° F. whereupon the heater is shut off and the canister allowed to cool to a preset level such as 220° F. The vapor fan or pump 38 or 138 connected to the outlet 214 or within the tank 110 is actuated when the canister first reaches 250° F. thereby drawing a vacuum on the adsorber 208. The vapor boiling off the adsorber is drawn through the fan or pump and driven through the pores of the sparger 36 or 136 for dissolution in the liquid gasoline.

With the drop in canister temperature to 220° F., the heater is energized. The canister is cycled between 250° F. and 220° F. and the vapor fan or pump 38, 138 operated until the capacitance of the sensor 222 changes to a level indicating insufficient vapor adsorbed in the canister, whereupon the heater and vapor pump are shut off.

The vapor emission control system is self contained and independent of the operation of the vehicle with the exception of a source of uninterrupted electric power for the module, heater and fan. The method of operating the system can be modified. As an example, the vapor fan or pump 138 of FIG. 2 can be operated during refilling of the tank to immediately redissolve a portion of the head space vapor. The check valve 120 can be kept open to permit the vacuum created during desorption to draw vapor and air from the head space through the canister or, the check valve can be actuable by the module to close during the desorption cycle of the canister.

Various other features of the canister can be modified. The heating means for the canister can be embedded in the plastic wall of the canister or coated on the inside or outside wall of the canister. An insulating blanket can be applied to the outside wall of the canister. Depending upon the location of the canister in the vehicle, engine heat or exhaust heat can be directed to the canister in lieu of electic heat.

Figure 8:
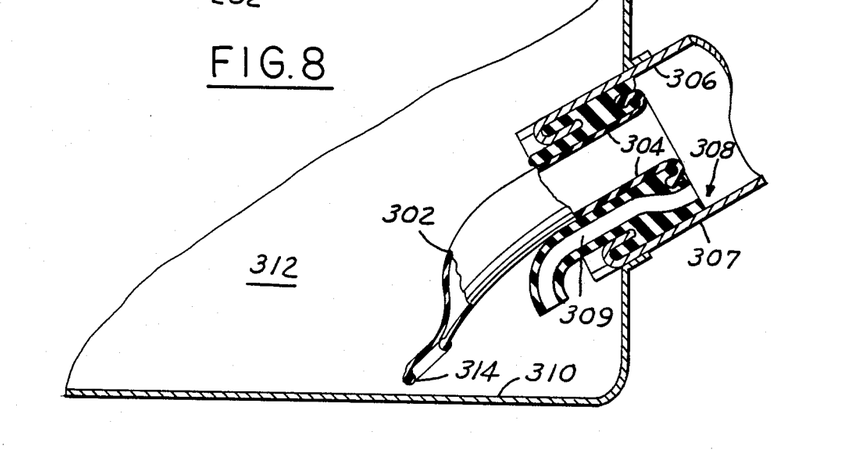
FIG. 8 is a side view of an alternative splash back valve.
Figure 9:
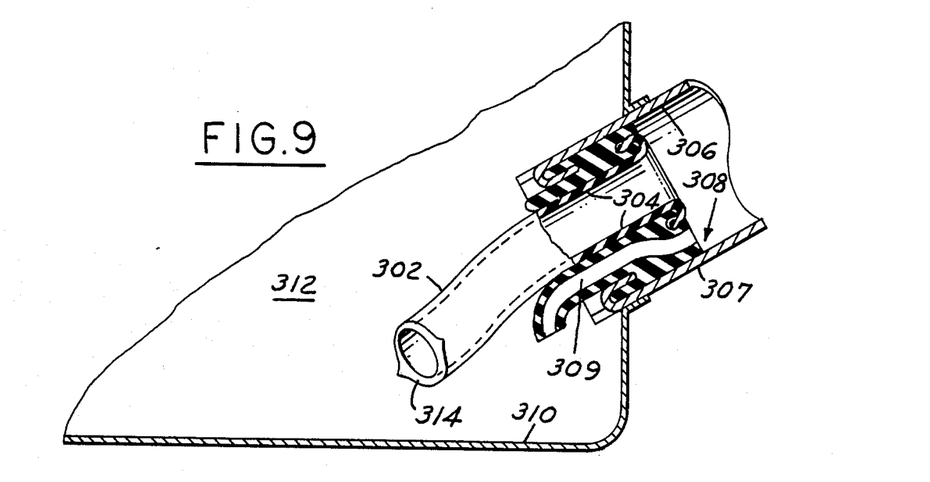
FIG. 9 is a side view of the splash back valve of FIG. 8 in open form.

In FIGS. 8 and 9 an alternative form of valve to prevent back splash up the fill pipe is illustrated. The valve comprises very limp tube 302 of rubber or plastic. The entrance 304 of the tube 302 is attached to or otherwise retained against the inner periphery 306 of the fill pipe 307 with the exception of the lowermost portion of the fill pipe at 308. At this lowermost portion of the fill pipe 307, a second relatively small but rigid tube 309 prevents open fluid communication between the fill pipe 307 and the bottom liquid fluid volume 312 of the tank 310.

The exit end of the valve comprises a metal ring 314 attached to the flexible tube end. The metal ring 314 is sufficiently heavy that the limp flexible tube 302 cannot support the ring generally upright without assistance. Thus, the ring 314 will collapse the tube 302 and rest adjacent the bottom of the tank as illustrated in FIG. 8. The rigid tube 309 is equipped with means 316 at the tank end thereof to assure that regardless of the position or shape of the limp flexible tube 302, the tank end 316 of the rigid tube 309 is not blocked. A downward elbow bend in the rigid tube 309 is illustrated as an example.

The heavy metal ring 314 causes the limp flexible tube 302 to hang collapsed adjacent the bottom of the tank 310 thereby preventing flow back up the fill pipe 307. With the pressurization of the limp flexible tube 302 by the rush of incoming gasoline during filling of the tank 310, the tube 302 becomes sufficiently rigid to lift and support the ring 314 as shown in FIG. 9 thus opening the valve. So long as gasoline is flowing down the fill pipe 307 into the tank 310, the valve will remain open. Immediately upon stoppage of flow, the heavy ring 314 will cause collapse of the limp flexible tube 302 and closure of the valve. Liquid splash back and head space vapor is not able to travel back into the fill pipe.

The small rigid tube 309 assures that the hdyrostatic pressure increase in the bottom volume 312 of the tank is filled is transmitted up the fill pipe 307 despite the down rushing gasoline from the pump nozzle, thus assuring that the automatic pump nozzle cut off will operate properly as the tank 310 is topped off with gasoline. Since the rigid tube 309 is immersed in liquid gasoline, vapors from the tank head space are not transmitted up the fill pipe 307.

The valve is formed of a molded shape with the ring 314 vulcanized or otherwise attached thereto. Alternatively, the tube 302 may be molded about the ring. The rigid tube 309 may be formed as a part of the thick walled portion of the tube 302 engaging the inner periphery 306 of the fill pipe, the rigidity being provided by the relatively thick wall or in separate parts with relatively rigid portion 303 engaging the fill pipe inner periphery 306 as shown. Mechanical or adhesive means may be used to attach the valve to the end of the fill pipe 307 such as the metal crimps 318 engaging the thick walled portion of the tube 302 or rigid portion 303. The rigid portion 303 may be extended downwardly as an outer rigid protective tube 305 about but spaced from flexible tube 302. The outer rigid tube 303, preferably constructed of plastic, prevents the tube 302 from abrading in sliding on the steel tank bottom.

Figure 10:
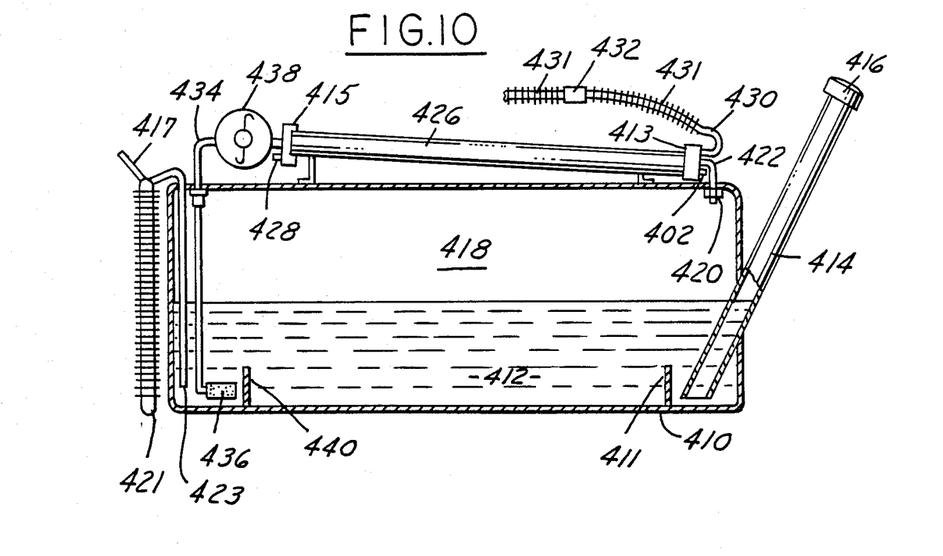
FIG. 10 is a schematic view of a gasoline fuel tank and vapor emission control system modified for return liquids and vapors.

Illustrated in FIG. 10 is a gasoline fuel tank 410 having a relatively long tubular canister 426 attached thereabove. The tank is shown partially filled with liquid 412 and a head space 418 filled with a mixture of air and fuel vapor. An inlet conduit 422 communicates through a check valve 420 with the head space 418 and the right end of the canister 426. The canister 426 is slightly tilted to the right and a water drain valve 402 is located at the lowermost part of the canister. A fill pipe 414 and cap 416 are located at the right side of the tank 410 with a splash baffle 411 positioned to prevent back splash directly up the fill pipe.

At the left end of the canister 426 is a check valve air vent 428 and a conduit 434 leading through a vapor fan 438 back into the tank 410 and a sparger 436. The sparger is positioned behind a baffle 440 to provide full immersion of the sparger when the tank is almost empty of liquid fuel. The placement of the canister above the tank reduces the likelihood of liquid fuel entering the canister and permits the use of a relatively long thin tube filled with adsorbent. A straight through flow from right to left of the head space air vapor combination is provided with this embodiment. The end caps 413 and 415 can be fitted with all the necessary attachments, both internal and external, for the canister. Thus, a simple tube can be used for the body of the canister and the length adjusted for various fuel tank volumes.

Two additional optional features are illustrated in FIG. 10. Modern automotive engines tend to produce relatively high temperatures in return liquids and vapors. For carbureted engines, the vapor return conduit 430 may be provided with cooling fins 431 on either side of check valve 432 to reduce the vapor temperature before entry into the canister 426 and thereby increase the adsorption effectiveness of the canister.

On some carbureted engines and on fuel injection engines, return conduits to the tank 410 for liquid fuels are provided. In particular, the high pressure fuel injection pump can product a significant temperature increase to the return liquid thus increasing the tank liquid temperature and the tendency of the liquid to vaporize. In FIG. 10 the liquid return line 417 is fitted with a finned heat exchanger 421 external to the tank. The return line then passes into the tank to an outlet 421 behind the baffle 440 and adjacent the sparger 436. Thus, the outlet 423 is kept submerged behind the baffle 440 to reduce or prevent splashing of the return liquid fuel. Preferably the heat exchanger, which may merely comprise finned tubing or a more sophisticated device, should be located in a region of good air circulation to bring the liquid fuel to ambient temperature before entry into the tank.

Figure 11:
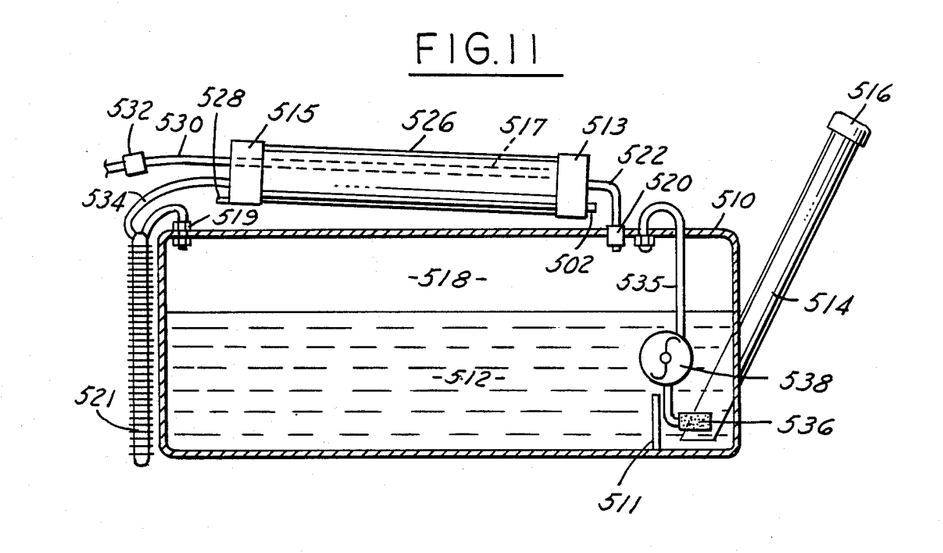
FIG. 11 is a schematic view of a gasoline fuel tank and vapor emission control system modified to cool canister return vapors.

Illustrated in FIG. 11 is a gasoline fuel tank 510 again equipped with a fill pipe 514 and cap 516. The fill pipe entrance to the tank is located behind a splash baffle 511 as is the sparger 536. A longer tubular canister 526 is positioned above the tank 510 having an inlet conduit 522 and check valve 520 from the head space 518 of the tank. Separately leading from the head space 518 is a conduit 535 which passes through a vapor fan 538 to the sparger 536. As with the embodiment of FIG. 2, the conduit 535, fan 538 and sparger 536 return vapor from the head space directly to the liquid 512.

The conduit 534 leading from the canister 526 to the head space, however, is equipped with a finned heat exchanger 521 located in a region of good air circulation. The vapors desorbed from the canister at a relatively high temperature are thereby cooled to ambient temperature before re-entry through the check valve 519 into the head space 518 of the tank. As with the above embodiments the canister 526 may be equipped with a vapor return line 530 and check valve 532, a water drain valve 502 and air vent check valve 528. The canister 526 is of tube and end cap construction as in the embodiment of FIG. 10. With the vapor return line 530 entering the left end cap 515 an internal tube 517 leads to the internal volume adjacent the right end cap 513.

I claim:

1. An evaporative control for an automotive fuel tank comprising a canister containing a fuel vapor adsorbent, vapor inlet means to the canister for fluid communication with the head space of a fuel tank, vapor return means from the canister for fluid communication to a fuel tank, a sparger locatable in a fuel tank and a vapor fan in fluid communication with the sparger, said vapor fan in fluid communication with the vapor return means, and capacitor means to sense the amount of adsorbed vapor in the canister over a continuous range of adsorption and in response to a preset limit less than saturation to actuate the vapor fan.

2. The evaporative control of claim 1 including means to heat the canister adsorbent, said heating means actuatable by said electric means.

3. The evaporative control of claim 1 wherein the vapor return means is directly connected to the vapor fan.

4. The evaporative control of claim 1 wherein the vapor return means is directly connectable to the head space of a tank and the vapor fan is directly connectable to the head space of a tank.

5. The evaporative control of claim 1 including means to heat the canister adsorbent and logic control means to operate the heating means and vapor fan in response to a preselected combination of one or more conditions sensed by the logic control means.

6. The evaporative control of claim 5 including logic control means comprising a preprogrammable electric logic circuit and including the means to sense as one of the conditions the amount of vapor adsorbed in the canister.

7. An evaporative control for an automotive fuel tank comprising a canister containing a fuel vapor absorbent, vapor inlet means to the canister for fluid communication with the head space of a fuel tank, vapor return means from the canister for fluid communication to a fuel tank, a sparger locatable in a fuel tank and a vapor fan in fluid communication with the sparger, said vapor fan in fluid communication with the vapor return means,
means to heat the canister adsorbent and logic control means to operate the heating means and vapor fan in response to a preselected combination of one or more conditions sensed by the logic control means, and
means to release air desorbed of vapor from the canister and means to release water from the canister.

8. The evaporative control of claim 7 wherein the logic control means includes means to operate the water release means.

9. An evaporative control for an automotive fuel tank comprising a canister containing a fuel vapor adsorbent, vapor inlet means to the canister for fluid communication with the head space of a fuel tank, vapor return means from the canister for fluid communication to a fuel tank, a sparger locatable in a fuel tank and a vapor fan in fluid communication with the sparger, said vapor fan in fluid communication with the vapor return means, and
wherein at least one of the vapor inlet means and vapor return means include means to cool vapor flowing therethrough.

10. The evaporative control of claim 1 including fluid return means from an engine in fluid communication with the canister.

11. The evaporative control of claim 10 wherein said fluid return means comprise vapor return means directly connected to the canister.

12. The evaporative control of claim 10 wherein said fluid return means comprise liquid return means directly connectable to a tank, said liquid return means including means to cool liquid flowing therethrough.

13. The evaporative control of claim 1 wherein the sensing means includes means to sense changes in the capacitance of the adsorbent as a function of adsorbed vapor and including preprogrammable electric logic control means and means to cause desorption of vapor from the adsorbent, said means to desorb vapor and said vapor fan operable by the logic control means in response to sufficient change in capacitance of the sensing means.

14. The evaporative control of claim 1 wherein the sparger comprises a plurality of porous means spaced apart chambers through which fluids can circulate and co-mingle between the porous means and chambers.

15. The evaporative control of claim 14 wherein said porous means and chambers comprise a plurality of spaced apart sleeves of porous material.

16. The evaporative control of claim 1 including a collapsible check valve attachable to the fill pipe of a tank, said valve comprising a flexible tube, means at the upper end of the tube for attachment to a fill pipe, a weighted ring surrounding the lower end of the tube, said ring of sufficient weight to collapse the lower end of the tube.

17. The evaporative control of claim 16 including a second tube attachable to the fill pipe of a tank to communicate between the fill pipe interior and tank interior, said second tube relatively rigid to provide substantially static pressure communication between the fill pipe and tank.

18. An automotive evaporative control fuel tank comprising a hollow tank, a canister containing a fuel vapor adsorbent, a conduit communicating between the head space of the hollow tank and the canister, a second conduit communicating between the canister and the lower portion of the hollow tank, a sparger located in the lower portion of the hollow tank, a vapor fan in fluid communication with the sparger and said vapor fan and sparger in fluid communication with the canister, capacitor means to sense the amount of adsorbed vapor in the canister over a continuous range of adsorption and in response to a preset limit less than saturation to activate the vapor fan.

19. The fuel tank of claim 18 wherein the sparger is directly connected to the second conduit within the lower portion of the hollow tank and the vapor fan is connected in the second conduit between the canister and the sparger.

20. The fuel tank of claim 18 including a third conduit connecting the head space of the tank to the sparger, the vapor fan being connected in the third conduit between the sparger and the head space.

21. The fuel tank of claim 18 including means to heat the canister adsorbent and including logic control means to operate the heating means and vapor fan in response to a preselected combination of one or more conditions sensed by the logic control means.

22. The fuel tank of claim 21 wherein the logic control means comprise a preprogrammable electric logic circuit and the canister includes means to sense as one of the conditions the amount of vapor adsorbed in the canister.

23. The fuel tank of claim 18 including preprogrammable electric logic control means, means to sense changes in the capacitance of the adsorbent as a function of adsorbed vapor and means to cause desorption of vapor from the adsorbent, said means to desorb vapor and the vapor fan operable by the logic control means in response to sufficient change in capacitance of the sensing means.

24. The fuel tank of claim 18 wherein the sparger comprises a plurality of porous means spaced apart by chambers through which fluids can circulate and comingle between the porous means and chambers.

25. The fuel tank of claim 18 including a fill pipe extending into the tank, a collapsible check valve attachable to the lower end of the fill pipe and located within the tank, said valve comprising a flexible tube, means at the upper end of the tube for attachment to the fill pipe, a weighted ring surrounding the lower end of the tube, said ring of sufficient weight to collapse the lower end of the tube.

* * * * *

UNITED STATES PATENT AND TRADEMARK OFFICE
CERTIFICATE OF CORRECTION

PATENT NO. : 4,829,968
DATED : May 16, 1989
INVENTOR(S) : George R. Onufer

It is certified that error appears in the above-identified patent and that said Letters Patent is hereby corrected as shown below:

Col. 1, line 21: Delete "producers" and substitute --procedures--.

Col. 1, line 44: Insert --also-- after "are".

Col. 4, line 18: Insert --vent-- after "one-way".

Col. 4, line 32: Delete "engie" and substitute --engine--.

Col. 5, line 6: Delete "12" and substitute --112--.

Col. 5, line 66: Delete "ceeramic" and substitute --ceramic--.

Col. 6, line 32: Insert --charging-- after "electric".

Col. 6, line 66: Delete "actuable" and substitute --actuatable--.

Col. 7, line 17: Delete "prevents" and substitute --provides--.

UNITED STATES PATENT AND TRADEMARK OFFICE
CERTIFICATE OF CORRECTION

PATENT NO. : 4,829,968

DATED : May 16, 1989

INVENTOR(S) : George R. Onufer

It is certified that error appears in the above-identified patent and that said Letters Patent is hereby corrected as shown below:

Col. 7, line 18: Delete "fluid" and substitute --filled--.

Col. 7, line 46: After "tank" insert --310 as the tank--

Col. 8, line 41: Delete "product" and substitute --produce--.

Col. 10, line 29: Insert --by-- after "apart".

Signed and Sealed this

Twenty-fifth Day of February, 1992

Attest:

HARRY F. MANBECK, JR.

*Attesting Officer*  *Commissioner of Patents and Trademarks*